United States Patent [19]

Bennett et al.

[11] 3,725,883

[45] Apr. 3, 1973

[54] MODULAR DISK FILE UNIT

[75] Inventors: Eugene E. Bennett; Alpheus F. Stansell, both of Thousand Oaks, Calif.

[73] Assignee: Burroughs Corporation, Detroit, Mich.

[22] Filed: Mar. 13, 1972

[21] Appl. No.: 234,170

Related U.S. Application Data

[63] Continuation of Ser. No. 864,296, Oct. 3, 1969.

[52] U.S. Cl.....340/174.1 C, 274/41.4, 340/174.1 H, 346/102, 346/137

[51] Int. Cl........G11b 5/00, G11b 5/74, G11c 11/02

[58] Field of Search.340/174.1 C, 174.1 H; 346/102, 346/137; 274/41.4; 308/189 R

[56] References Cited

UNITED STATES PATENTS

| | | | |
|---|---|---|---|
| 2,546,829 | 3/1951 | Mallina | 340/174.1 C |
| 2,765,459 | 10/1956 | Winter | 340/174.1 H |
| 3,172,082 | 3/1965 | Dirks | 340/174.1 C |
| 3,196,422 | 7/1965 | Cheney | 340/174.1 C |
| 3,475,741 | 10/1969 | Toney | 340/174.1 C |
| 3,509,992 | 5/1970 | David et al. | 346/137 X |
| 3,525,086 | 8/1970 | Lichowsky | 340/174.1 C |
| 3,529,301 | 9/1970 | Hiruta | 340/174.1 C |
| 2,649,808 | 8/1953 | Slater et al. | 308/189 R |
| 3,372,962 | 3/1968 | Linsley | 308/189 R |

*Primary Examiner*—Maynard R. Wilbur
*Assistant Examiner*—Thomas J. Sloyan
*Attorney*—Christie Parker & Hale

[57] ABSTRACT

An arrangement for magnetic disk memories having a plurality of modular memory disk units in separate housings mounted in a single cabinet is described. Support yokes for each unit support a pair of hubs with the rotatable disk mounted between bearings in the two hubs. In addition, a closed, substantially circular, housing around the disk is mounted on the hubs to maintain dimensional stability relative to the disk in radial and circumferential directions. Magnetic recording heads are mounted on sides of the housing generally toward the periphery and are, therefore, maintained in precise position relative to the disk. Matched pairs of preloaded angular contact bearings are employed for mounting the disk on a shaft in the hub and both inner and outer races of the bearings are clamped in place. Undue loads on the bearings are prevented by making the housing with flexural rigidity in a direction along the axis of the bearings high enough to hold the recording heads in substantially fixed position and low enough to apply an insubstantial axial load on the bearings.

12 Claims, 4 Drawing Figures

INVENTORS
EUGENE E. BENNETT
ALPHEUS F. STANSELL
BY
Christie, Parker, & Hale
ATTORNEYS

MODULAR DISK FILE UNIT

CROSS REFERENCE TO RELATED APPLICATIONS

This is a continuation, division of application Ser. No. 864,296, filed Oct. 3, 1969.

BACKGROUND

A valuable random access memory for modern day computers and data processors involves a magnetic memory disk rotating at high velocity with magnetic recording heads arranged adjacent the surfaces of the disk for reading and writing thereon. In order to achieve reliable operation of the disk and to store data at a high density, that is, bits of information per unit area on the disk, the magnetic recording heads must be maintained in precise position relative to the rapidly moving disk. The disk and head mounting arrangements must accommodate differential thermal expansion and the disk and housing must be relatively insensitive to external vibrations or influences. It is also important that the disk rotate in a stable position without substantial vibration or other oscillatory variations in position. It is, therefore, important that the bearing support for the magnetic memory disk be quite stable.

In some computer installations a plurality of magnetic disk memories are employed, and it has been the practice to mount four such magnetic disks in a single housing with separate magnetic recording head mountings also within the housing. In this arrangement, a central support hub and drive mechanism is employed with a cantilevered shaft extending from each side of the central hub. A pair of magnetic disks was mounted on each of the shafts so extending, and all four disks rotated together. Dimensional stability in the rotating disks can be difficult with such an arrangement since the disks are cantilevered on the support shaft from a central hub. In addition, with four such disks in a single unit, a defect or failure in any of the disks or other components of the unit often necessitated removal of the entire unit of four disks from operation.

Mention has been made of a housing for the magnetic memory disks and this is a significant element since the moving disk and stationary magnetic recording heads operate at very close spacings so that contamination which might enter the system is a problem to be avoided. The housings are, therefore, sealed, and often include cleansing filters and air circulation equipment for minimizing the effect of contamination on the operation of the disk memory units. Because of the extreme cleanliness requirements for reliable operation of the magnetic memory disks, maintenance and repair is preferably performed in a clean room substantially free of particulate contamination. The availability of such repair facilities is limited and a substantial time may be required to transport and repair a defective unit. When a plurality of magnetic disk memories are included in a single unit, a repair cycle has a more significant impact on computer operation. It is, therefore, desirable to have a modular memory disk unit having a single disk in a closed housing and also have a highly stable disk and recording head mounting for long-term, reliable operation.

BRIEF SUMMARY OF THE INVENTION

Therefore, in practice of this invention according to a preferred embodiment there is provided a rotatable member supported on bearings in a pair of hubs, each of which is supported in a cabinet. A closed housing having magnetic recording heads mounted thereon, is provided around the rotatable member and is also centrally supported on the hubs for dimensional stability. In a preferred embodiment, inner and outer races of bearings in the hub supporting the rotatable member are fixed to the rotatable member and housing, respectively, and the housing is formed with flexural rigidity sufficient to hold recording heads near the periphery in substantially fixed position and low enough to apply an insubstantial axial force on the bearings.

DRAWINGS

Objects and many of the attendant advantages of this invention will be appreciated as the same becomes better understood by reference to the following detailed description when considered in connection with the accompanying drawings wherein.

Throughout the drawings like reference numerals refer to like parts.

DESCRIPTION

Figure 1:
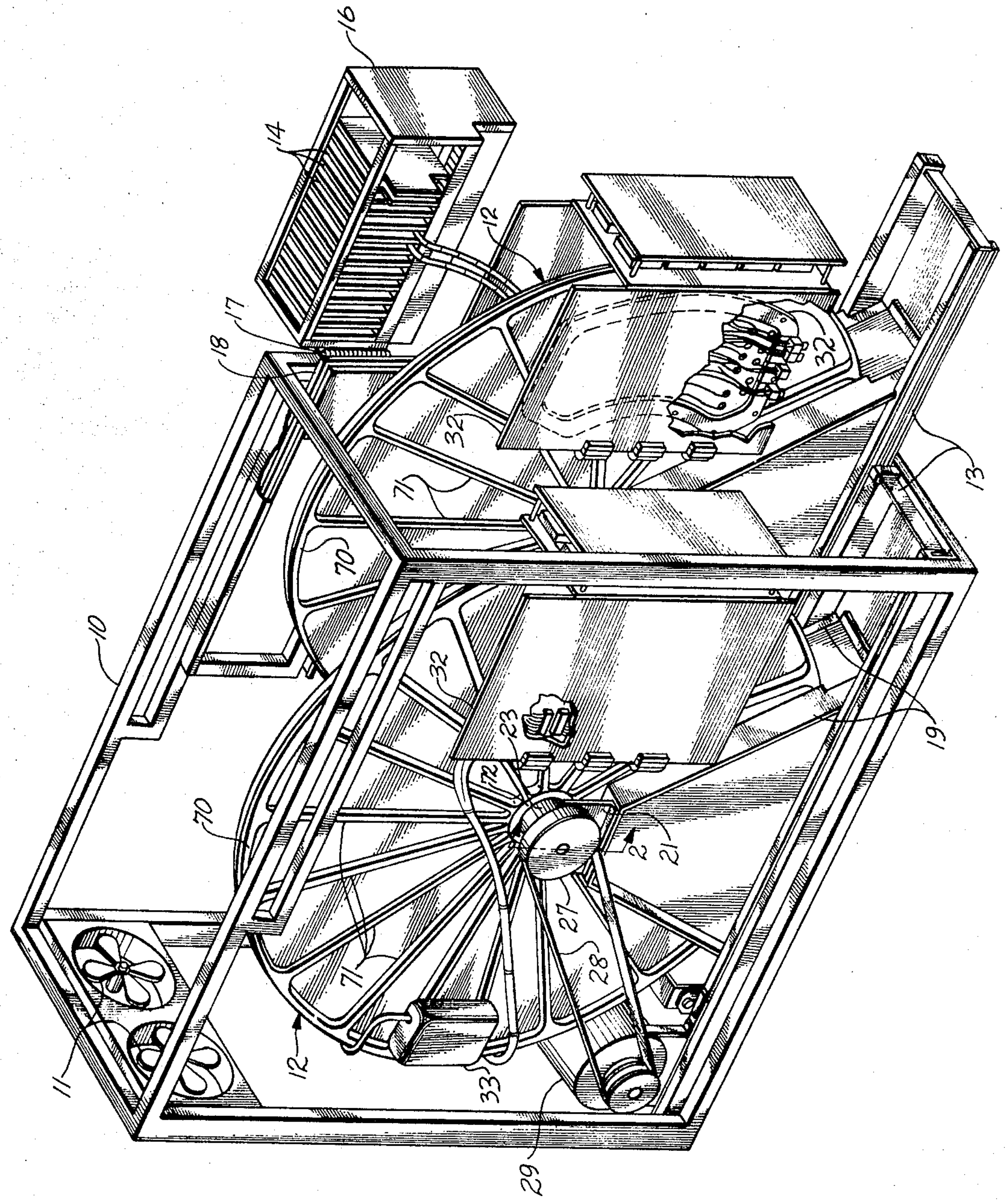
FIG. 1 illustrates in perspective a modular memory disk unit constructed according to principles of this invention.

FIG. 1 illustrates a modular memory disk file unit constructed according to the principles of this invention. As illustrated in this embodiment, there is provided a cabinet 10, of which the edge stiffening elements are illustrated and the sheet metal sides deleted for purposes of illustration so that the internal operating mechanisms can be more clearly seen. In practice, sheet metal sides are usually employed on the cabinets; however, one or more sides may be omitted if desired where a plurality of cabinets are arranged side by side to jointly provide an enclosure. Cooling fans 11 are provided in the rear of the cabinet for maintaining a reasonably constant temperature therein, and for circulating air for enhancing temperature uniformity throughout the cabinet.

In the illustrated embodiment, a modular pair of rotatable disk magnetic memory units 12 are provided in the cabinet. Each of the modular memory units 12 is mounted in a drawer 13 for ready withdrawal from the front of the cabinet on roller supported tracks in substantially the same manner conventionally employed for file cabinet drawers and the like.

In the illustrated embodiment, various conventional electronic elements associated with the magnetic memory are mounted on printed circuit boards 14, mounted on a support rack 16. The support rack 16 is mounted on a hinge 17 which is attached to a slidable member 18 which can move fore and aft in the cabinet 10. This permits the rack 16 supporting the printed circuit boards to be moved forward and to one side as in FIG. 1 to permit ready removal of the disk file units 12 from the cabinet. If desired the support rack 16 can be mounted on a slide and made disconnectable so as to be removed to provide access to the recording units.

Figure 2:
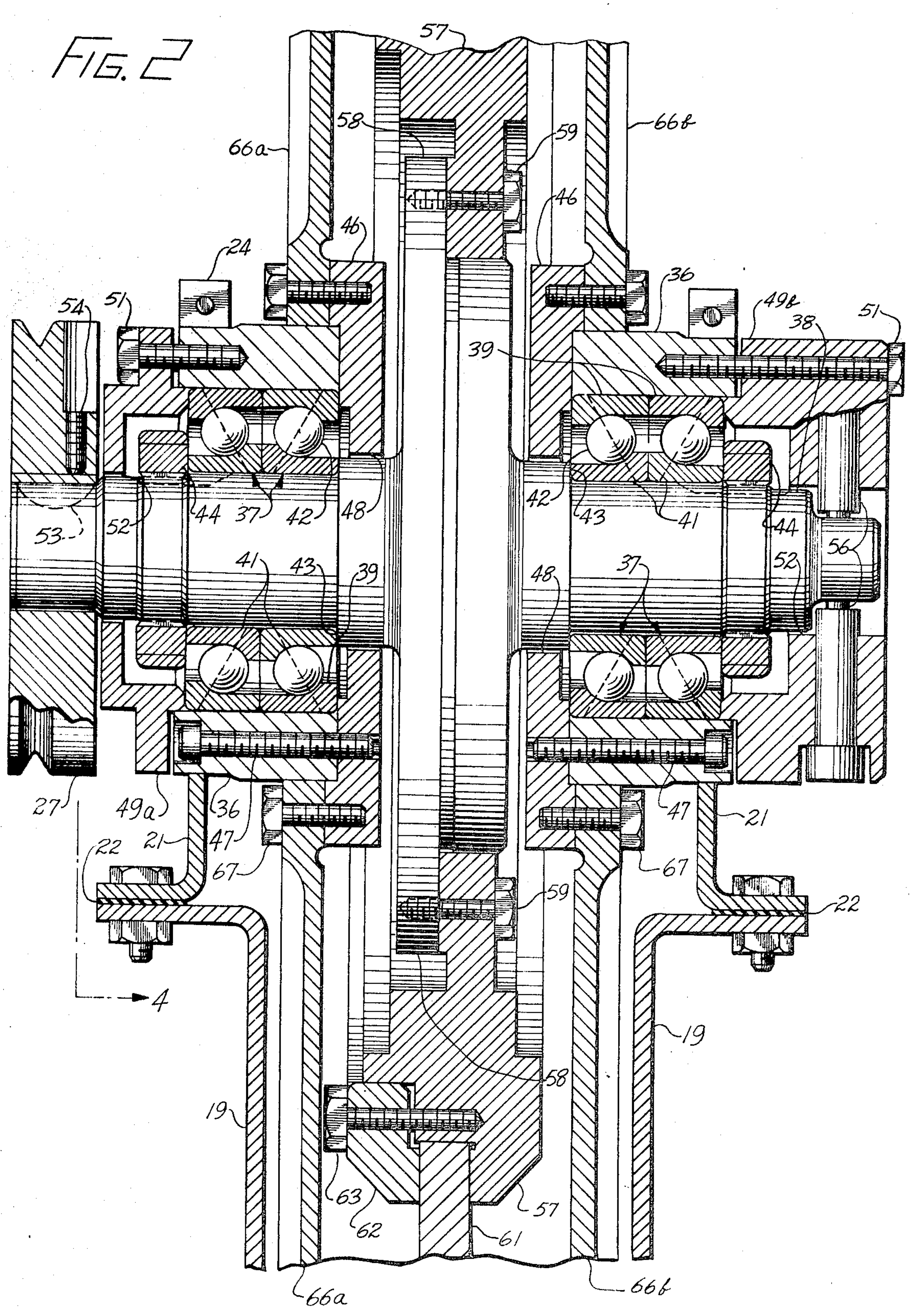
FIG. 2 illustrates in transverse cross section a mounting hub arrangement for the memory disk unit of FIG. 1.
Figure 4:
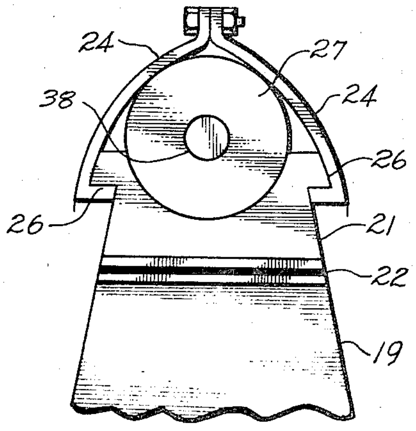
FIG. 4 is a detail of a hub supporting structure.

A pair of trapezoidal metal support brackets 19 are welded in each of the drawers 13 so as to straddle the lower portion of the memory unit 12. Other shapes of support brackets can be employed. A support yoke 21 is mounted atop the support bracket 19 and is electrically insulated therefrom by a plastic or rubber layer 22 (FIGS. 2 and 4). The electrical insulation 22 also serves to provide a degree of mechanical isolation between the support bracket 19 and the yoke 21 so that vibrations and accelerations applied to the cabinet are to some extent isolated from the memory disk unit 12. The support brackets 19 have a sufficient degree of lateral deflection to minimize axially directed loads on the structure mounted thereon.

A hub 23 described hereinafter in greater detail is mounted in the support yoke 21 as can be seen in the semi-schematic view of FIG. 4 wherein the hub 23 rests in a mating cradle in the yoke 21. A pair of straps 24 are hooked onto ears 26 on the support yoke and are bolted together at their opposite ends over the hub 23 so as to hold the hub in position.

Referring again to FIG. 1, a pulley 27 is provided on the hub 23 for rotating the memory disk as hereinafter described, and the pulley is driven by a conventional drive belt 28 connected to a motor 29. A separate drive motor 29 may be employed for each of the memory units 12, or if desired a motor with drive pulley at each end thereof may be employed to drive two memory disk units.

Figure 3:
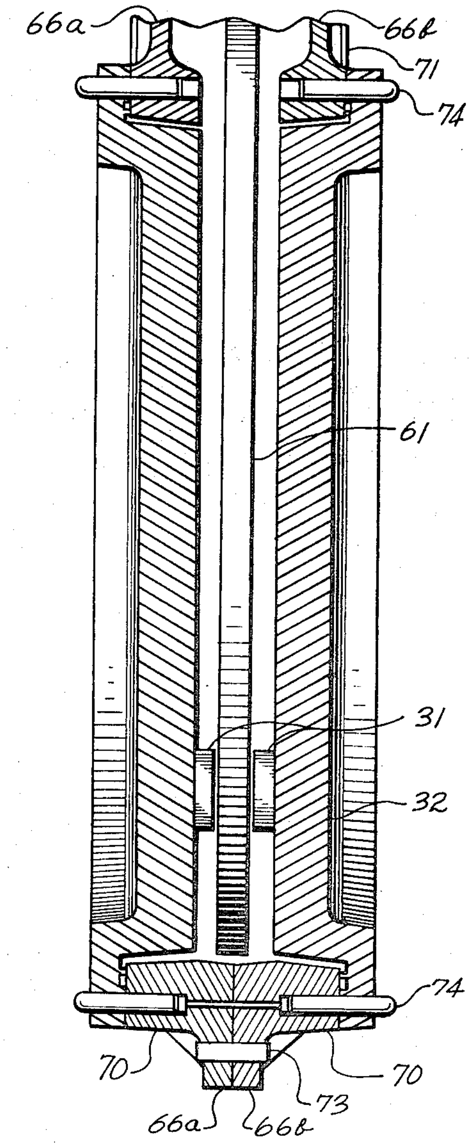
FIG. 3 is a fragmentary cross section showing an edge of the memory disk housing.

Mounted on each side of each of the memory units 12 are a plurality of magnetic recording heads 31, a pair of which are illustrated schematically in FIG. 3 without the conventional associated pneumatic and electric connections. A plurality of such heads are mounted on a head mounting plate 32 (FIGS. 1 and 3) which is affixed to the side of the memory unit 12 and forms a portion of a housing for the memory unit. The recording heads 31 are within the housing, which is described hereinafter in greater detail, so as to be adjacent the rotatable recording disk, and are therefore not seen in FIG. 1. A "clock" head 33 is also provided on the side of the memory unit 12 at a location about 180° from the magnetic recording heads 31. In conventional operation, the clock head 33 is a magnetic recording head that keeps track of the current position of the rotating disk memory so that appropriate magnetic recording heads 31 are actuated at the proper time for reading or writing a bit of information in a selected location on the disk. Since the clock head is located about 180° on the disk from the other recording heads, it will be apparent that good radial and circumferential dimensional stability is required not only in the disk but also in the mounting for the clock and recording heads. A position variation between the separated recording heads could lead to significant errors since data would be recorded or read at an improper location on the disk.

Referring now to FIG. 2, additional detail of the hubs employed in mounting the memory units 12 can be seen. The two hubs for each modular disk file unit are substantially identical except for an outer bearing cap or shield and a pulley mounting as hereinafter set forth in greater detail. Each of the hubs has a main support ring 36 which is cradled in the support yoke 21 and held in place by the straps 24 as hereinabove described.

Within the main support ring 36 in each hub are a duplex pair of conventional angular contact ball bearings 37. The bearings 37 are mounted on the journals of a disk support shaft 38 to rotatably support the shaft in the hubs. Each of the bearings 37 has an outer race 39 adjacent the main support ring 36, and an inner race 41 adjacent the journal on the shaft 38. The races 39 and 41 are asymmetrical in angular contact bearings so that when the races of a duplex pair of such bearings are axially preloaded against each other, that is, tightly clamped together, the direction of application of load on the balls 41 of the bearing is angulated relative to the plane of the bearing as indicated by the phantom lines in FIG. 2. The axial preloading of the angular contact bearings removes any play that may be present in the bearings and thereby assures precise and constant positioning of the structures mounted on the bearings.

In order to obtain the axial preload on the inner races 41 of the bearings, they are clamped between a shoulder 43 on the support shaft 38 and a self-locking nut 44 threaded onto the support shaft.

Axial preload on the outer races 39 of the bearings 37 is applied by a pair of bearing caps or shields attached to the main support ring 36. Axial preload is obtained due to the shape of the races and the clamping of only one set of races is needed. The described structure provides for clamping either the inner or outer races. Thus, an inner bearing cap 46 is fastened to the main support ring by a plurality of bolts 47. The cap 46 not only bears on the outer race 39 of the bearing, but also has an inwardly extending portion providing a narrow clearance 48 around a portion of the shaft 38 to minimize the possibility of passage of particles or other contaminants from the bearings 37 to the interior of the memory disk unit. It will be recognized by one skilled in the art that the clearance 48, between the cap and shaft, is in the nature of a conventional labyrinth seal. An outer bearing cap 49, (49*a* and 49*b*, respectively) is provided on each of the hubs and fastened to the main support ring 36 by a plurality of bolts 51. Each of the outer caps 49 has a narrow clearance 52 with a portion of the shaft 38 to provide an additional labyrinth seal for minimizing entrance of contaminants into the memory unit. The outer caps 49 also bear on the outer races 39 of the bearings so that the outer races are clamped against the inner caps 46 to axially preload each pair of the bearings and prevent outer race precession.

Prevention of outer race precession is of concern because of the high density of data storage on magnetic disks. In a typical embodiment, data bits may be stored at a rate of 1,000 to 3,000 bits per inch along a circular path on the magnetic disk. Even the best bearings may have an eccentricity between the inner race and outer race in excess of the distance between adjacent bits. If the bearing race remains fixed the eccentricity remains in the same location and there is no error in the position of data. If, on the other hand, the bearing races precess, the eccentricity will displace the disk and erroneous data will be written or read. This is particularly acute where the recording heads are displaced from the clock head as in the illustrated embodiment where they are about 180° apart. If the shift in eccentricity occurs 90° from the heads, the data actually recorded may be several spaces from its intended location. Precession forces almost invariably are present due to slight unbalance of the rapidly rotating disk. By clamping both inner and outer bearing races, the precession forces are resisted and the disk is thereby maintained in position.

The shaft 38 extends beyond one of the outer caps 49*a* for connection to the pulley 27 which is secured to the shaft by a key 53 and set screw 54. Thus, as the pulley 27 is driven by a belt 28 (FIG. 1), the shaft 38 is rotated in the bearings 37.

The outer cap 49*b* on the hub opposite from the pulley 27 has conventional brushes 56 mounted therein to provide continuous electrical contact with an end portion of the shaft 38. The brushes 56 are electrically connected to a ground (not shown) so that the magnetic disk unit is properly grounded.

A disk mounting ring 57 is fastened to a central flange 58 on the shaft 38 by a plurality of bolts 59. A conventional magnetic memory disk 61 is closely fitted on the disk mounting ring 57 and is rigidly secured thereto by a clamping ring 62 which is connected to the mounting ring 57 by a plurality of bolts 63. Thus, as the shaft 38 rotates, the mounting ring 57 and magnetic disk 61 also rotate. In a typical unit the disk 61 may be about three feet in diameter so that tight fits and precise mounting is required to preclude vibration or other shifts in disk position.

A centrally mounted substantially circular housing 66 comprising two allochiral halves 66*a* and 66*b* is provided around the rotatable magnetic memory disk 61. The two halves of the housing 66 are fastened to the fixed inner caps 46 of the hubs by a plurality of bolts 67.

Referring again to FIG. 1 it will be seen that each housing half 66 has a rim 70 at the periphery. Extending inwardly from the rim 70 are a plurality of radial ribs 71 for providing a controlled flexural rigidity of each housing half as described in greater detail hereinafter. The radial ribs 71 terminate in a central mounting flange 72 at the hub. Alignment pins 73 (FIG. 3) are employed at the periphery of the housing halves for maintaining precise alignment therebetween. A plurality of bolts (not shown) through the rim 70 at the outer ends of the ribs 71 are employed for holding the two housing halves together.

Because of the rim 70 holding the two housing halves together, each housing half is substantially rigid at the periphery. Since the center mounting flanges 72 are not rigidly fastened together and are effectively mounted at the inner ends of the elongated ribs 71, appreciable elastic flexibility is obtained at the housing center. In the illustrated embodiment, the stiffness at the periphery of the housing halves is achieved by a strong rim and center deflectability is achieved by a thin housing reinforced with ribs. It will be apparent that the same effect can be obtained by making the periphery of the housing halves relatively thicker and the center relatively thinner.

The recording head mounting plate 32 on each side of the modular unit is bolted to the housing half around the periphery of the mounting plate. As illustrated in FIG. 3 the edge of the recording head mounting plate 32 is secured directly to the rim 70 of the housing half. The position of the head mounting plate is fixed by alignment pins 74 in the housing halves. The head mounting plates are each made with substantial thickness so as to be substantially rigid. Since this rigid structure has an edge secured to the substantially rigid rim of the housing, it is effectively cantilevered inwardly from the rim. This cantilevered mounting of the recording heads from the rigid rim of the housing serves to hold the recording heads in a substantially fixed position relative to the rotating magnetic memory disk.

The head mounting plates 32 illustrated in FIG. 3 are shown only schematically without detailed provision being illustrated for mounting the recording heads 31 and the extensive associated connections. In a typical installation as many as 42 separate magnetic recording heads may be mounted on each head mounting plate, and each recording head has a pneumatic actuator plus a large number of electrical connections for separate control of each of the several active recording elements on each magnetic recording head. The mounting of the individual recording heads and associated connections is conventional and is therefore omitted from the drawings for purposes of clarity.

As pointed out hereinabove, the outer races 39 of the bearings 37 in each hub are clamped together by the inner and outer bearing caps 46 and 49, respectively, which are coupled together by the main support ring 36. The two inner shields on opposite sides of the disk are, in turn, fastened to the halves of the housing 66 so that the outer races of the bearings on the two sides of the rotating disk 61 are connected together by a substantially rigid structure. Similarly, the inner races 41 of the bearings 37 are all secured to the shaft assembly 38 so that the inner races are also connected by a rigid structure.

The interconnection of the inner races of spaced-apart bearings by one absolutely rigid structure, and interconnection of the outer races of the same bearings by another absolutely rigid structure, would apparently represent a poor design, since accumulation of manufacturing tolerances and differential thermal expansion between a steel shaft 38 and an aluminum housing 66, for example, would cause excessively high axial loads on the bearings. In order to avoid such a design problem and excessively high bearing loads, the housing 66 is made with relatively less flexural rigidity in the center portion where it is attached to the inner shields 46 than at the rim so that it is sufficiently compliant or elastically deformable to accommodate all expected manufacturing tolerances, thermal expansion, or other dimensional variations without applying an undue axial load on the bearings.

It should be noted, however, that if the housing 66 which supports the magnetic recording heads 31 adjacent the rotating magnetic memory disk 61 were readily deformed throughout its extent, the required precision in positioning the recording heads relative to the disk would be sacrificed. For this reason, the periphery of the housing is made with a rim, or otherwise stiffened, to accommodate the loads due to the magnetic recording heads.

The magnetic recording heads in a rotating disk memory conventionally are spaced from the surface of the disk during operation at a spacing of less than 100 micro-inches so that a gas film bearing is formed between the face of the magnetic recording head and the surface of the rapidly moving disk. The gas film bearing between the recording head and the disk exerts a substantial pressure on the magnetic recording head and this pressure is counteracted by a pneumatic actuator or the like pressing the recording head towards the disk. Such an arrangement is described and illustrated in U.S. Pat. No. 3,310,792.

Magnetic recording heads are mounted on both sides of the rapidly revolving disk for maximum data storage capacity and also so that loads due to the fluid film bearings on the two sides are equally balanced so that no lateral deformation of the disk occurs. Thus, as illustrated in FIG. 3, magnetic recording heads 31 are mounted on head mounting plates 32 on both sides of the housing 66. The loads of the fluid film bearings between the magnetic recording heads and the disk are transferred to the plates 32 which are rigidly connected to the housing and thereby apply an outwardly directed force on each side of the housing. Magnetic recording heads are mounted near the periphery of the disk so that the greatest possible track length is available for recording data. Thus, for example, in one embodiment the outermost head is 1.2 inches from the rim of the housing and the innermost is 7.4 inches from the center. The outwardly directed force due to the fluid film bearings of the magnetic recording heads is greatest for the heads nearest the periphery since the relative surface speed of the disk is highest at its periphery. The greatest force is therefore applied to the head mounting plates nearest the attachment to the rigid rim and therefore where the length of the cantilevered "beam" is shortest. By cantilevering the head mounting plate from the rigid rim, substantially all of the load due to the heads is taken up by the rim with very little applied to the bearings. Thus in a typical embodiment the outwardly directed force due to the fluid film bearings between the heads and the disk is in the order of about 400 pounds. Since the load is principally near the periphery and the head mounting plate is cantilevered from the rigid rim, an axial load of only about 10 pounds is applied to the central bearings. The load applied to the bearings due to differential thermal expansion is negligible. The maximum load on the bearings due to accumulation of tolerances is only about 20 pounds which is readily accommodated by conventional duplex angular contact bearings. A total deflection of about 0.003 inch can occur on either side of the housing without significant load on the bearings.

Another way of viewing the selective rigidity provided in the housing is to consider each housing half **66*a* or 66*b* as a membrane with a substantially rigid rim. With such an arrangement, a point relatively near the periphery where the magnetic recording heads are mounted is quite resistant to deformation of the membrane, and a point near the center is relatively free to deflect under smaller forces. The magnitude of possible displacement will also be greater at the center of the membrane as it flexes as lateral forces are applied. By fixing the central portion of the membrane to the bearings 37, which are effectively held in a fixed spacing by the shaft 38**, gross movements of the housing are prevented.

It is a feature of the housing that it has a flexural rigidity in a direction normal to the principal extent of the housing within a range of values limited at one extreme by the minimum rigidity required to hold magnetic recording heads cantilevered from the rim in a substantially fixed position, and at the other extreme by the maximum rigidity that will apply an insubstantial axial load on the central bearings. These operating characteristics, being functional in nature, may be achieved by a wide range of structural configurations which may differ considerably from each other in details of construction, but will nevertheless embody the basic principle. Thus the detailed structural arrangement of the housing halves will be dependent on materials of construction, head loads applied, size, manufacturing economies, modulus of elasticity of the construction material, magnitude of acceptable axial load on the bearings, magnitude of acceptable lateral displacement of magnetic recording heads and the like.

Thus, by a proper balance of stiffness or flexural rigidity in the housing, the magnetic recording heads near the periphery are held in a substantially fixed position, and bearing loads at the center of the housing are maintained within tolerable limits. A selectively stiffened housing supported in its center, as herein described, is substantially rigid in both the radial and circumferential dimensions, is relatively flexible in a direction transverse to the radius at the center mounting, due to the long moment arm to the center and yet is substantially inflexible in a transverse direction near the periphery where magnetic recording heads are mounted. It is more important in positioning magnetic recording heads on a rotating disk that the radial and circumferencial positions be maintained with precision since these dimensions determine the position on the disk where data is recorded, and some tolerance can be accepted in position transverse to the plane of the disk since the exact position of the magnetic recording head is determined by the force applied on the head opposed to the force of the fluid film bearing.

It will, of course, be noted that the housing 66 is supported only at its center on the hubs and is not otherwise supported in the cabinet. The magnetic recording heads are mounted only on the housing. With this arrangement the heads are effectively isolated from dimensional changes due to the cabinet. Previously, support structures mounted in a cabinet held recording heads adjacent a disk which was separately supported in the cabinet. Substantial position changes could occur with such a mounting. In the mounting arrangement herein described with the circular housing holding the recording heads supported centrally with the same support as the disk, there is a symmetry that minimizes unwanted deflections and effectively removes all influences due to dimensional changes of the cabinet and the like due to thermal changes or mechanical stresses.

The term "journal box" is used herein to designate those elements of the combination adjacent the center of the rotatable disk that are fixed in position, that is, non-rotatable, except for the elastic housing, bearings, and the journal box support structure. In the preferred embodiment hereinabove described, each journal box includes an inner bearing cap 46, a main support ring 36 and an outer bearing cap 49. The elastic housing is in the form of two halves **66*a* and 66*b*. The bearings in the preferred embodiment include outer races 39, inner races 41, and balls 42. The journal box support structure comprises brackets 19 and yokes 21**. It will be apparent that this is only exemplary and various individual elements of the combination can be integral, rather than being bolted together as in the preferred embodiment. Additional components may appear in the journal box in other embodiments.

It will be apparent to one skilled in the art that many other modifications and variations can be made in apparatus constructed according to the principles of this invention. Thus, for example, many differences in details of the disk and housing mounting structures can be made as desired to facilitate manufacturing or assembly of the units. In the illustrated embodiment two modular units are contained in a single cabinet; however, it will be apparent that a fewer or greater number of similar units can be housed together to share electronic assemblies, air purification and pressurization systems and the like.

What is claimed is:

1. A modular magnetic memory disk unit comprising:
- a rotatable magnetic memory disk;
- a first bearing on one side of the disk for rotatable support thereof in a substantially fixed axial position;
- a second bearing on the opposite side of the disk from the first bearing for rotatable support thereof in a substantially fixed axial position;
- a first journal box supporting the first bearing;
- a second journal box supporting the second bearing;
- means for supporting the first journal box;
- means for supporting the second journal box;
- a substantially closed housing surrounding the disk, said housing being supported only by the first and second journal boxes; and
- a plurality of magnetic recording heads mounted on said housing and adjacent opposite sides of the disk; and
- wherein said housing is substantially rigid in the portion where the recording heads are mounted and elastically deformable in a direction normal to the disk in the portion adjacent the journal boxes.

2. A modular magnetic memory disk unit comprising:
- a rotatable magnetic memory disk;
- a first bearing on one side of the disk for rotatable support thereof in a substantially fixed axial position;
- a second bearing on the opposite side of the disk from the first bearing for rotatable support thereof in a substantially fixed axial position;
- a first journal box supporting the first bearing;
- a second journal box supporting the second bearing;
- means for supporting the first journal box;
- means for supporting the second journal box;
- a substantially closed housing surrounding the disk, said housing being supported only by the first and second journal boxes, said housing comprising first and second substantially circular halves, each in the form of a flexible membrane with a rigid rim, in face-to-face relation on opposite sides of the disk, said halves being supported at their respective centers on the respective journal boxes and interconnected at their peripheries; and
- a plurality of magnetic recording heads mounted on said housing in a rigid portion thereof near the rim and adjacent opposite sides of the disk.

3. A modular magnetic memory disk unit comprising:
- a rotatable magnetic memory disk;
- a first bearing on one side of the disk for rotatable support thereof in a substantially fixed axial position;
- a second bearing on the opposite side of the disk from the first bearing for rotatable support thereof in a substantially fixed axial position;
- a first journal box supporting the first bearing;
- a second journal box supporting the second bearing;
- means for supporting the first journal box;
- means for supporting the second journal box;
- a substantially closed housing surrounding the disk, said housing comprising first and second substantially circular halves in face to face relation on opposite sides of the disk, said housing halves being mounted at their respective centers on the respective journal boxes and interconnected at their peripheries;
- a rigid mounting plate secured to each housing half at its periphery and cantilevered inwardly from the periphery for remaining in a substantially fixed position; and
- a plurality of magnetic recording heads mounted on each of the mounting plates and adjacent opposite sides of the disk.

4. A memory unit as defined in claim 3 wherein each of the housing halves is relatively more stiff at its perimeter and relatively less stiff adjacent its center.

5. A memory unit as defined in claim 4 wherein;
- the first and second bearings are duplex pairs of angular contact bearings each having a pair of inner bearing races fixed relative to the memory disk and a pair of outer bearing races fixed relative to the respective housing half.

6. A modular magnetic memory disk unit comprising:
- a rotatable magnetic memory disk;
- a first duplex pair of angular contact ball bearings on one side of the disk for rotatable support thereof in a substantially fixed axial position and having a pair of inner bearing races fixed relative to the memory disk;
- a second duplex pair of angular contact ball bearings on the opposite side of the disk from the first bearings for rotatable support thereof in a substantially fixed axial position and having a pair of inner bearing races fixed relative to the memory disk;
- a first journal box supporting the first bearing and fixed relative to the outer bearing races thereof;
- a second journal box supporting the second bearing and fixed relative to the outer bearing races thereof;
- means for supporting the first journal box;
- means for supporting the second journal box;

a substantially closed housing surrounding the disk, said housing comprising first and second substantially circular halves in face-to-face relation on opposite sides of the disk, said housing halves being mounted at their respective centers on the respective journal boxes and interconnected at their peripheries, each housing half being relatively more stiff at its perimeter and relatively less stiff adjacent its center;

a mounting plate secured to each housing half at its periphery and cantilevered inwardly from the periphery for remaining in a substantially fixed position; and a plurality of magnetic recording heads mounted on each of the mounting plates and adjacent opposite sides of the disk; and wherein each of the means for supporting the journal boxes has relatively less flexural rigidity in a direction normal to the disk than the housing halves adjacent their centers.

7. A modular magnetic memory disk unit as defined in claim 6 wherein;

the first and second journal boxes each comprise:

a main support ring around the respective outer bearing races and connected to the means for supporting the respective journal box;

a first bearing cap secured to the main support ring and having a portion pressed against an end of one of the outer bearing races;

an outer bearing cap secured to the main support ring and having a portion pressed against an end of the other outer bearing race, said unit further comprising:

a support shaft for the rotatable magnetic memory disk, and mounted in the inner bearing races, the shaft including a shoulder against an end of one of the inner bearing races; and a nut on the support shaft and pressed against the end of the other of the inner bearing races.

8. A rotatable disk magnetic memory unit comprising:

a cabinet;

a plurality of modular disk memory units in the cabinet;

means for mounting each of the modular units in the cabinet for ready removal therefrom;

means in the cabinet for rotatably driving at least a portion of each of the memory units;

each of the modular memory units comprising:

a rotatable magnetic memory disk;

a first journal box on one side of the memory disk;

a second journal box on the other side of the memory disk;

first bearing means for rotatably supporting the disk in the first journal box in a substantially fixed axial position relative thereto;

second bearing means for rotatably supporting the disk in the second journal box in a substantially fixed axial position relative thereto;

means for supporting the first journal box in the cabinet;

means for supporting the second journal box in the cabinet;

a closed housing surrounding the disk and supported only on the first and second journal boxes; and a plurality of magnetic recording heads mounted on the housing adjacent opposite faces of the disk.

9. A rotatable disk magnetic memory unit comprising:

a cabinet;

a plurality of modular disk memory units in the cabinet;

means for mounting each of the modular units in the cabinet for ready removal therefrom;

means in the cabinet for rotatably driving at least a portion of each of the memory units;

each of the modular memory units comprising;

a rotatable magnetic memory disk;

a first journal box on one side of the memory disk;

a second journal box on the other side of the memory disk;

first bearing means for rotatably supporting the disk in the first journal box in a substantially fixed axial position relative thereto;

second bearing means for rotatably supporting the disk in the second journal box in a substantially fixed axial position relative thereto;

means for supporting the first journal box in the cabinet;

means for supporting the second journal box in the cabinet;

housing means for elastically interconnecting the journal boxes with a flexural rigidity in a direction normal to the plane of the disk within the range of values limited at one extreme by the minimum rigidity required to hold a peripheral portion of the housing means in substantially fixed position, and at the other extreme by the maximum rigidity that applies an insubstantial axial load on the bearing means; said housing means comprising a closed housing surrounding the disk and supported only on the first and second journal boxes; and a plurality of magnetic recording heads mounted on the housing adjacent opposite faces of the disk.

10. A rotatable disk memory unit as defined in claim 9 wherein the housing comprises a first substantially circular housing half mounted at its center on the first journal box;

a second substantially circular housing half mounted at its center on the second journal box, each of the first and second housing halves having a substantially rigid rim at its periphery, the peripheral rims being secured together for forming a substantially rigid housing periphery; and a recording head mounting plate for supporting at least a portion of the magnetic recording heads, each of the recording head mounting plates being secured to the peripheral rim of a housing half and cantilvered inwardly therefrom for holding the magnetic recording heads in a substantially fixed position.

11. A rotatable disk magnetic memory unit comprising:

a rotatable magnetic memory disk;

a first journal box on one side of the memory disk;

a second journal box on the other side of the memory disk;

first bearing means for rotatably supporting the disk in the first journal box in a substantially fixed axial position relative thereto;

second bearing means for rotatably supporting the disk in the second journal box in a substantially fixed axial position relative thereto;

means for supporting the first journal box;

means for supporting the second journal box, each of said means for supporting applying an insubstantial axial load on the bearings;

a substantially closed housing surrounding the disk and supported only on the first and second journal boxes; and a plurality of magnetic recording heads mounted on the housing adjacent opposite faces of the disk; and wherein said bearing means each comprises a first bearing part fixed to its respective journal box and a second bearing part fixed to the housing; and wherein the housing has a flexural rigidity in a direction normal to the plane of the disk within the range of values limited at one extreme by the minimum rigidity required to hold the recording heads in substantially fixed position, and at the other extreme by the maximum rigidity that applies an insubstantial axial load on the bearing means.

12. A modular magnetic memory disk unit comprising:

a rotatable magnetic memory disk;

a first bearing on one side of the disk for rotatable support thereof in a substantially fixed axial position;

a second bearing on the opposite side of the disk from the first bearing for rotatable support thereof in a substantially fixed axial position;

a first journal box supporting the first bearing;

a second journal box supporting the second bearing;

means for supporting the first journal box;

means for supporting the second journal box;

means for interconnecting the journal boxes with a flexural rigidity in a direction normal to the plane of the disk within the range of values limited at one extreme by the minimum rigidity required to hold the recording heads in a substantially fixed position, and at the other extreme by the maximum rigidity that applies an insubstantial axial load on the bearing means, said means comprising a substantially closed housing surrounding the disk and comprising first and second substantially circular halves in face-to-face relation on opposite sides of the disk, said halves being mounted at their respective centers on the respective journal boxes and interconnected at their peripheries; and a plurality of magnetic recording heads mounted on said housing adjacent opposite sides of the disk.

* * * * *